United States Patent

Tamaki et al.

[11] 4,245,608
[45] Jan. 20, 1981

[54] IDLING CONTROL APPARATUS FOR INTERNAL COMBUSTION ENGINE

[75] Inventors: Sigeo Tamaki, Katsuta; Tohru Nakagawa, Mito, both of Japan

[73] Assignee: Hitachi, Ltd., Japan

[21] Appl. No.: 53,816

[22] Filed: Jul. 2, 1979

[30] Foreign Application Priority Data

Jul. 14, 1978 [JP] Japan .................. 53-86459

[51] Int. Cl.³ .............................................. F02M 23/00
[52] U.S. Cl. .................................... 123/588; 261/39 E
[58] Field of Search .......... 123/119 F, 124 A, 124 B, 123/119 D, 124 R; 261/39 B, 39 D, 39 E, 63

[56] References Cited

U.S. PATENT DOCUMENTS

| | | |
|---|---|---|
| 3,246,886 | 4/1966 | Goodyear ............... 261/39 B |
| 3,381,945 | 5/1968 | Charron ................. 261/39 B |
| 3,645,509 | 2/1972 | Eckert . | |
| 3,670,709 | 6/1972 | Eckert ................... 261/39 D |
| 3,699,937 | 10/1972 | De Petris ............... 261/39 B |
| 3,898,967 | 8/1975 | Bennett . | |
| 4,102,315 | 7/1978 | Fahim ..................... 123/119 F |

FOREIGN PATENT DOCUMENTS

610595 10/1960 Italy ........................ 261/39 E

*Primary Examiner*—Ronald H. Lazarus
*Attorney, Agent, or Firm*—Craig & Antonelli

[57] ABSTRACT

An idling control apparatus for an internal combustion engine includes a valve element amounted in a passage for air for idle running of the engine bypassing a throttle valve mounted in a suction conduit for communicating a portion of the suction conduit upstream of the throttle valve with a portion thereof downstream of the throttle valve, and a bimetal member in the form of a spiral operatively connected to the valve element for varying the quantity of air flowing through the passage for air for idle running of the engine in accordance with changes in the temperature of the engine. The end of an outermost convolution of the bimetal member is a fixed and the end of an innermost convolution of the bimetal member is a movable member, and a bimetal shaft connected to the movable end of the bimetal member for transmitting a displacement of the bimetal member to the valve element is journalled by a bearing means, thereby inhibiting vibration of the bimetal member to prevent variations in the quantity of air flowing through the passage for air for idle running of the engine from occurring.

6 Claims, 2 Drawing Figures

IDLING CONTROL APPARATUS FOR INTERNAL COMBUSTION ENGINE

BACKGROUND OF THE INVENTION

This invention relates to idling control apparatus for internal combustion engines, and more particularly it is concerned with an idling control apparatus for an internal combustion engine wherein air for sustaining idle running of the engine that bypasses the throttle valve mounted in the suction conduit in the throttle body has its quantity controlled in accordance with changes in the temperature of the engine.

Generally, an internal combustion engine has a throttle valve mounted in the section conduit for controlling the quantity of air supplied to the engine as the driver of the vehicle operates the throttle valve, regardless of whether the engine is of the fuel injection type or the carburetor type. In an internal combustion engine, an idling control apparatus is mounted separately from the throttle valve for controlling the quantity of air supplied to the engine during idle running thereof. The idling control apparatus is designed to effect control of idle running of the engine by means of a valve mounted in a passage for air for idle running of the engine which communicates a portion of the suction conduit upstream of the throttle valve with a portion of the suction conduit downstream of the throttle valve by bypassing the throttle valve, for controlling the quantity of air flowing through such passage in accordance with changes in the temperature of the engine.

One example of idling control apparatus disclosed in U.S. Pat. No. 3,645,509 comprises a valve element mounted in a passage bypassing the throttle valve which is operated by means of a heat sensitive, expanding body in a fluid state.

The use of a heat sensitive, expanding body in a fluid state for operating a valve element of an idling control apparatus as disclosed in U.S. Pat. No. 3,645,509 requires the provision of means for providing a liquidtight seal specifically fitted for this purpose. When the heat sensitive, expanding body in a fluid state undergoes deterioration with the passage of time, the quantity of air flowing through the passage by bypassing the throttle valve would vary from the quantity of air that flows through the passage when the apparatus is initially fitted to the internal combustion engine. Particularly, the heat sensitive, expanding body in a fluid state is faced with a difficulty in keeping its initial characteristics over a prolonged period of time. Moreover, a large number of part that are required for this type of idling control apparatus makes its cost high. In view of these problems, this type of idling control apparatus would not readily be put into practical use.

Meanwhile proposals have been made to use, in place of a heat sensitive, expanding body in a fluid state described in U.S. Pat. No. 3,645,509, a bimetal member in the form of a spiral substantially similar to the choke mechanism disclosed in U.S. Pat. No. 3,898,967, in an idling control apparatus for an internal combustion engine.

The butterfly valve operated by the bimetal member described in U.S. Pat. No. 3,898,967 is a choke valve which is opened with the progress of operation of the engine. On the other hand, in an idling control apparatus, a valve operated by a bimetal member should be closed with the progress of operation of the engine.

The idling control apparatus using a bimetal member is substantially similar to the apparatus disclosed in U.S. Pat. No. 3,898,967 except that the operation of the butterfly valve is reversed. More specifically, the idling control apparatus using a bimetal member comprises a butterfly valve located in a passage for air for idle running of the engine which communicates a portion of the suction conduit upstream of the throttle valve with a portion of the suction conduit downstream of the throttle valve by bypassing the throttle valve, the butterfly valve being supported for rotation by a shaft having secured thereto a lever which is in engagement with the end of an outermost convolution of the spiral bimetal member (movable end), and a pin secured to a bimetal housing for fixedly supporting the end of an innermost convolution of the spiral bimetal member (fixed end). As the temperature of the engine rises, the butterfly valve reduces the area of the passage for air for sustaining idle running of the engine.

The aforesaid idling control apparatus using a bimetal member offers the advantages of being simple in construction and low in cost. However, one of the problems encountered with regard to this apparatus is flapping of the butterfly valve which occurs during idle running of the engine and causes variations to occur in the quantity of air flowing through the passage for air for idle running of the engine.

This problem arises primarily from vibration of the bimetal member. More specifically, in an idling control apparatus using a bimetal member, the end of an innermost convolution of the bimetal member is a fixed end and the end of an outermost convolution thereof is a movable end, so that the bimetal member itself functions as a spring. Particularly, vibration of the engine causes the end of the outermost convolution of the spiral bimetal member to vibrate, thereby causing flapping of the butterfly valve to take place. Vibration of the bimetal member is transmitted from the end of the outermost convolution of the bimetal member which is a movable end to the shaft and lever, and vibration of the bimetal member tends to increase or reduce the opening of the butterfly valve, thereby varying the quantity of air flowing through the valve.

In addition, the butterfly valve itself is concerned in the development of variations in its opening. Like a known choke valve of a carburetor, the butterfly valve is supported by a shaft in a position which is eccentric and not at the center of the surface of the valve. Thus pulsation of the sucked air which occurs with the operation of the engine would cause the butterfly valve to vibrate, thereby adding to the vibration of the butterfly valve caused by the vibration of the bimetal member as aforesaid.

For the reasons stated hereinabove, the air flowing through the passage for air for idle running of the engine of an idling control apparatus of the prior art has tended to show variations during operation of the engine, thereby making it impossible to obtain stable idle running of the engine.

As described hereinabove, idling control apparatus can be broadly classified into two groups: one group using a heat sensitive, expanding body in a fluid state and the other group using a metallic heat sensitive, expanding body, such as a bimetal member.

This invention is directed to an idling control apparatus for an internal combustion engine using a bimetal member, which is relatively simple in construction and low in cost.

SUMMARY OF THE INVENTION

A primary object of the present invention is to provide an idling control apparatus for an internal combustion engine using a bimetal member, wherein means is provided for preventing vibration of the bimetal member during engine opeation to thereby minimize flapping of the valve element mounted in the passage for air for idle running of the engine and prevent variations in the quantity of air flowing through this air passage from occurring, thereby enabling stable idling of the engine to be obtained.

A secondary object of the present invention is to provide an idling control apparatus for an internal combustion engine using a bimetal member, wherein means is provided for minimizing flapping of the valve element mounted in the passage for air for idle running of the engine which would be caused by pulsation of the sucked air during engine operation, and this means, combined with the aforesaid means for minimizing flapping of the valve element by preventing vibration of the bimetal member, is conductive to the prevention of variations in the quantity of air flowing through this air passage from occurring, thereby enabling stable idling of the engine to be obtained.

The primary feature characteristic of the present invention is that the bimetal member in the form of a spiral for causing displacements of the valve element mounted in the passage for air for idle running of the engine to occur is arranged such that the end of an outermost convolution thereof is a fixed end and the end of an innermost convolution thereof is a movable end, and the bimetal shaft unitarily connected to the end of the innermost convolution of the bimetal member for transmitting a displacement of the bimetal member to the valve element in the passage for air for idle running of the engine is journalled by bearing means, so that vibration of the bimetal member can be inhibited and variations in the quantity of air flowing through the passage for air for idle running of the engine can be avoided.

The secondary feature characteristic of the present invention is that the valve element mounted in the passage for air for idle running of the engine for controlling the quantity of air flowing through this air passage is a needle valve capable of minimizing flapping of the valve element due to pulsation of the sucked air, so that this feature, combined with the feature of minimizing flapping of the valve element by inhibiting vibration of the bimetal member, can further prevent variations in the quantity of air flowing through the passage for air for idle running of the engine from occurring.

DESCRIPTION OF THE PREFERRED EMBODIMENTS

Figure 1:
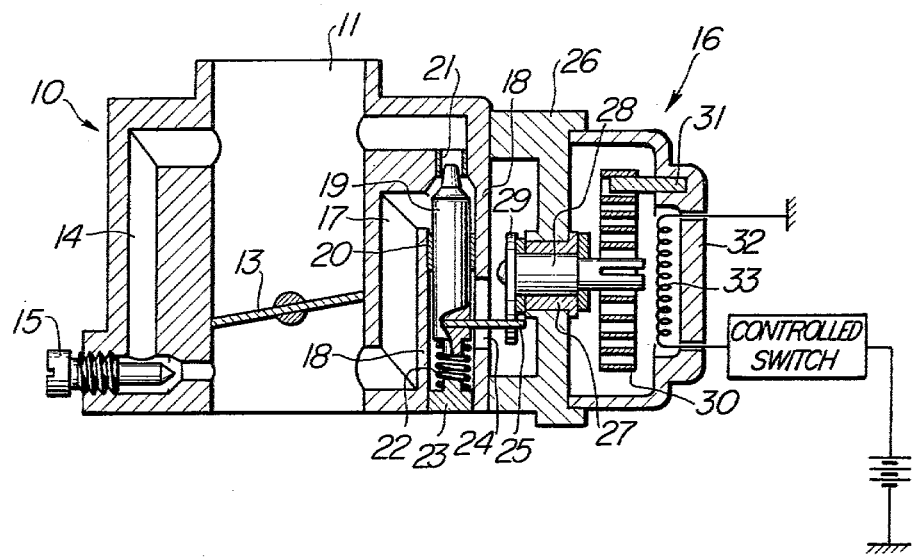
FIG. 1 is a vertical sectional view of the idling control apparatus for an internal combustion engine comprising one embodiment of the invention.

In FIG. 1, the reference numeral 10 generally designates a throttle body formed therein with a suction conduit 11 in which a throttle valve 13 is rotatably mounted. The throttle body 10 shown in FIG. 1 is used with a fuel injection apparatus. A portion of the suction conduit 11 upstream of the throttle valve 13 is maintained in communication with a portion of the suction conduit 11 downstream of the throttle valve 13 by an adjusting air passage 14 having an adjusting screw 15 mounted midway thereof. The adjusting air passage 14 and the adjusting screw 15 are for adjusting and setting the quantity of air handled by the throttle valve 13 and an idling control apparatus 16 in their initial conditions. More specifically, the adjusting air passage 14 and the adjusting screw 15 have the function of supplying, to an internal combustion engine to which the throttle body 10 is fitted, air in a quantity which is consistent with the performance of the particular engine.

The idling control apparatus 16 is constructed as follows. The reference numeral 17 designates a passage for air for idle running of the engine which communicates a portion of the suction conduit 11 upstream of the throttle valve 13 with a portion of the suction conduit 11 downstream of the throttle valve 13. The passage for air for idle running of the engine 17 which is formed in the throttle body 10 has walls serving as a guide 18 cylindrical in form and having a needle valve 19 slidably mounted therein. A collar 20 performing the functions of lubrication and airtight sealing is mounted between the needle valve 19 and guide 18. Fitted to a portion of the passage for air for idle running of the engine 17 which is positioned against the forward end of the needle valve 19 is a metering jet 21 cooperating with the needle valve 19 for metering air. It is to be understood that the needle valve 19 as a whole is not required to be exposed in the passage for air for idle running of the engine 17, and that what is essential is that at least the forward end of the needle valve 19 and the metering jet 21 are positioned in the passage for air for idle running of the engine 17.

Meanwhile a compression spring 22 is mounted between the lower end of the needle valve 19 and a plug 23 fitted in a gap at the lower end of the guide 18 and urges the needle valve 19 by its biasing force to move in a direction in which the forward end of the needle valve 19 closes the metering jet 21. The guide 18 is formed on one side thereof with a vertical slit 24 of a predetermined length through which extends a pin 25 secured to the needle valve 19. Thus movement of the pin 25 in the slit 24 results in the needle valve 19 also moving in sliding movement in the guide 18.

A bimetal housing 26 secured to the throttle body 10 as the bolts, not shown, is formed at its central portion with a rotary shaft bearing portion 27 for rotatably supporting a bimetal shaft 28 having secured to one end thereof a cam lever 29 and to the other end thereof the end of an innermost convolution of a spiral bimetal member 30. The cam lever 29 is maintained in contact with the pin 25, so that rotation of the cam lever 29 causes the pin 25 to move in the slit 24. Secured to the end of an outermost convolution of the spiral bimetal member 30 is a pin 31 secured to a bimetal cover 32. The bimetal cover 32 is secured to the bimetal housing 26 as by bolts, not shown. The pin 31 is secured to the bimetal cover 32 but may be secured to the bimetal housing 26. Mounted in the bimetal cover 32 is a heat generating resistor 33 for heating the bimetal member 30 which is a nichrome wire as shown but may be instead a ceramic resistor generally referred to as a PTC heater which has a positive temperature coefficient.

The operation of the idling control apparatus 16 of the construction described hereinabove will now be described. In idle running of the engine, the throttle valve 13 is either fully closed or slightly open. When the engine is cold, the bimetal member 30 is in a contracted state and its displacement is transmitted through the bimetal shaft 28, cam lever 29 and pin 25 to the needle valve 19. Thus when the engine is cold, the needle valve 19 is open in a manner to give a maximum open area to the metering jet 21. As a result, a larger quantity of air is supplied to the engine when the engine is cold than when the engine is warm, thereby enabling stable rotation of the engine to be obtained. If the quantity of air supplied to the engine is small when the latter is cold, it would be impossible for the engine to develop power high enough to overcome friction of the engine and other factors interferring with rotation of the engine and stable rotation of the engine would not be obtainable.

As the engine is warmed up gradually, the friction of the engine and other factors will be removed and the quantity of air that suits the engine in a cold state will become too large for the warmed-up engine, with the result that the number of revolutions of the engine rises and tends to exceed the number of revolutions for idling. When this is the case, one has only to reduce the quantity of air supplied to the engine in accordance with a rise in the temperature of the engine. In the idling control apparatus shown in FIG. 1, a current is passed to the heat generating resistor 33 upon starting of the engine to heat the bimetal member 30 and reduce the quantity of air. Heating of the bimetal member 30 by the heat generating resistor 33 causes a displacement of the bimetal member 30 to take place in such a manner that the number of convolutions of the spiral bimetal member 30 is increased. Since the end of the outermost convolution of the spiral bimetal member 30 is secured to the bimetal cover 32 by the pin 31, the displacement of the bimetal member 30 is transmitted to the bimetal shaft 28 to cause the latter to rotate. This causes the cam lever 29 secured to the bimetal shaft 28 to rotate, so that rotation of the bimetal shaft 28 moves the pin 25 in the slit 24 and the needle valve 19 secured to the pin 25 also moves against the biasing force of the compression spring 22 to reduce the area of opening of the metering jet 21. Thus the quantity of air supplied to the engine is reduced.

Further heating of the bimetal member 30 produces further movement of the needle valve 19 until finally the forward end of the needle valve is brought into contact with the metering jet 21, thereby minimizing the quantity of air flowing through the passage for air for idle running of the engine 17. When this state is reached, engine warmup has finished and the engine is rotating at a predetermined number of revolutions.

The idling control apparatus constructed and operating as described hereinabove offers the following advantages. First, the arrangement that the end of the outermost convolution of the bimetal member 30 is secured to the bimetal cover 32 and the end of the innermost convolution of the bimetal member 30 is secured to the bimetal shaft rotatably journalled by the bearing section makes it possible to minimize vibration of the bimetal member 30, thereby preventing the valve element mounted in the passage for air for idle running of the engine 17 from flapping.

A resilient member such as a spiral bimetal member tends to vibrate at its free end when subjected to vibration. In the present invention, the end of the outermost convolution of the bimetal member in the form of a spiral is fixed in place and the shaft 28 secured to the end of the innermost convolution thereof is journalled by the bearing section, so that the bimetal member 30 hardly vibrates even if vibration of the engine is transmitted thereto.

In idling control apparatus of the prior art using a bimetal member, the end of the outermost convolution of the bimetal member in the form of a spiral is free. As a result, the free end of the bimetal member vibrates when vibration of the engine is transmitted to the bimetal member. Vibration of the free end of the bimetal member is transmitted to the valve element mounted in the passage for air for idle running of the engine and causes flapping of the valve element to occur.

Secondly, the valve element mounted in the passage for air for idle running of the engine 17 is a needle valve. This specific form of the valve element minimizes flapping thereof due to pulsation of the sucked air. More specifically, since the metering jet 21 and the forward end of the needle valve 19 are positioned relatively to be concentric with each other, substantially uniform pressure would be applied to the vicinity of the forward end portion of the needle valve when pulsation of the sucked air occurred.

In idling control apparatus of the prior art, a butterfly valve is supported eccentrically or in a position displaced from the center of the surface of the valve. In this type of valve, when pulsation of the sucked air occurred, a greater force would be exerted on a portion of the surface of a larger area than on a portion of the area of a smaller area, thereby causing flapping of the butterfly valve to occur.

As described hereinabove, the idling control apparatus shown in FIG. 1 offers the advantages that vibration of the bimetal member and the valve element due to vibration of the engine and pulsation of the sucked air can be inhibited, thereby allowing a reduction in variation in the quantity of air flowing through the passage for air for idle running of the engine to be obtained.

Figure 2:
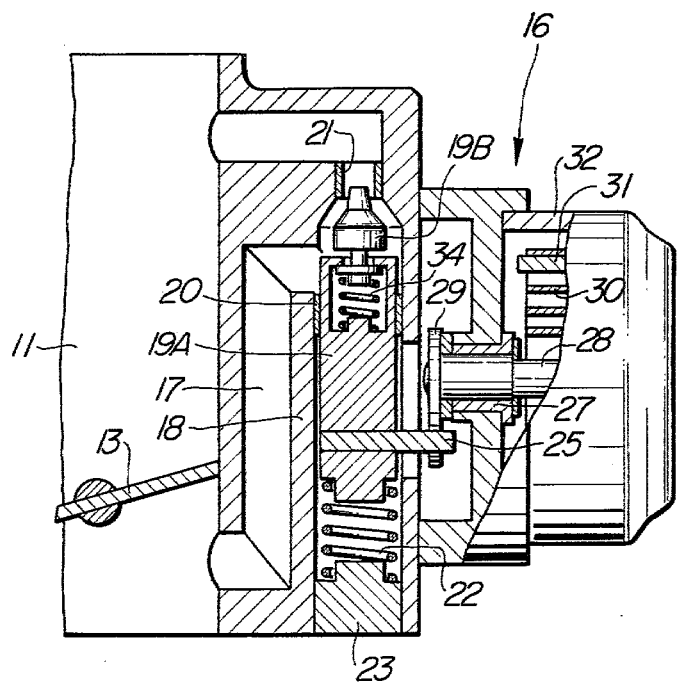
FIG. 2 is a vertical sectional view of the essential portions of the idling control apparatus for an internal combustion engine comprising another embodiment of the invention.

Another embodiment of the present invention providing a further improvement in an idling control apparatus is shown in FIG. 2 wherein parts similar to those shown in FIG. 1 are designated by like reference characters. The embodiment shown in FIG. 2 is intended to provide means to absorb excess displacements of the bimetal member to thereby provide protection of the bimetal member.

In FIG. 2, the needle valve 19 is composed of two portions or a main body 19A having the pin 25 secured thereto and a valve portion 19B cooperating with the metering jet 21 for metering air. A compression spring 34 is mounted between the valve portion 19B and the main body 19A to normally keep the valve portion 19B spaced apart from the main body 19A a predetermined distance.

When the valve portion 19B is brought into contact with the metering jet 21 after warmup of the engine is finished, the bimetal member 30 may be further heated and its further displacement may take place. When this is the case, excess displacement is transmitted to the main body 19A through the bimetal shaft 28, cam lever 29 and pin 25. However, since the valve portion 19B is already in contact with the metering jet 21 the main body 19A merely moves toward the valve portion 19B by compressing the spring 34. Thus excess displacement of the bimetal member 25 is absorbed by the compression spring 34, thereby making it possible to avoid application of excess stress to the bimetal member 30.

From the foregoing description, it will be appreciated that in the idling control apparatus using a bimetal member according to the present invention, the end of an outermost convolution of the bimetal member in the form of a spiral is a fixed end and the end of an innermost convolution thereof is a movable end, and a bimetal shaft secured to the end of the innermost convolution is journalled by a bearing means. By this feature, vibration of the bimetal member due to vibration of the engine can be minimized. A reduction in vibration of the bimetal member is conducive to a reduction in variations in the quantity of air flowing through the passage for air for idle running of the engine, thereby enabling stable idling of the engine to be obtained.

What is claimed is:

1. An idling control apparatus for an internal combustion engine comprising:
    a passage for air for idle running of the engine communicating a portion of a suction conduit upstream of a throttle valve mounted in said suction conduit with a portion of said suction conduit downstream of said throttle valve, said suction conduit being fitted to a throttle body;
    a valve element mounted in said passage for air for idle running of the engine for varying the quantity of air flowing through said passage for air for idle running of the engine; and
    a bimetal member in the form of a spiral operatively connected to said valve element for reducing the quantity of air flowing through said passage for air for idle running of the engine as the temperature of the engine increases;
    wherein the improvement resides in the arrangement wherein the end of an outermost convolution of said bimetal member in the form of a spiral is a fixed end and the end of an innermost convolution of said bimetal member in the form of a spiral is a movable end, and a bimetal shaft connected to the end of the innermost convolution for transmitting a displacement thereof to said valve element is journalled by a bearing means.

2. An idling control apparatus as set forth in claim 1, wherein said valve element is a needle valve using, as a part of its guide, walls of said passage for air for idle running of the engine.

3. An idling control apparatus as set forth in claim 2, further comprising a sealing member mounted between the needle valve and its guide for lubrication.

4. An idling control apparatus as set forth in claim 2, wherein said needle valve is composed of a main body and a valve portion, and further comprising a compression spring mounted between said main body and said valve portion for providing a spacing interval of a predetermined value therebetween.

5. An idling control apparatus as set forth in claim 1, wherein said bimetal member is located between a bimetal housing and a bimetal cover, the end of the outermost convolution of said bimetal member is secured through a pin to one of said bimetal housing and said bimetal cover, and said bimetal shaft connected to the end of the innermost convolution of said bimetal member is journalled by the bearing fitted to the bimetal housing.

6. An idling control apparatus as set forth in claim 5, further comprising an electrical heat generating resistor mounted in said bimetal cover for heating said bimetal member.

* * * * *